(12) United States Patent
Shetty (10) Patent No.: US 7,127,435 B2
(45) Date of Patent: Oct. 24, 2006

(54) DISTRIBUTION THEORY BASED ENRICHMENT OF SPARSE DATA FOR MACHINE LEARNING

(75) Inventor: Ravindra K. Shetty, Bangalore (IN)

(73) Assignee: Honeywell International Inc., Morristown, NJ (US)

(*) Notice: Subject to any disclaimer, the term of this patent is extended or adjusted under 35 U.S.C. 154(b) by 837 days.

(21) Appl. No.: 09/899,424

(22) Filed: Jul. 3, 2001

(65) Prior Publication Data

US 2003/0018597 A1    Jan. 23, 2003

(51) Int. Cl.
    *G06F 17/16* (2006.01)
(52) U.S. Cl. .......................... 706/12; 382/133
(58) Field of Classification Search ............... 706/15, 706/16, 17, 18, 19, 20, 12
    See application file for complete search history.

(56) References Cited

U.S. PATENT DOCUMENTS 5,359,699 A * 10/1994 Tong et al. ................. 706/20
6,735,578 B1 * 5/2004 Shetty et al. ............... 706/16

OTHER PUBLICATIONS

Mario A.T. Figueiredo, "Adaptive Sparseness for Supervised Learning".*
B.D. Ripley, "Pattern Recognition via Neural Networks".*
Lars Kai Hansen and Jan Larsen, "Unsupervised Learning and Generalization".*
Kevin Swingler, "Applying Neural Networks—A Practical Guide" Academic Press, 1996.*
Jürgen Van Gorp et al., An Interpolation Technique for Learning With Sparse Data, 2000, SYSID 2000.*
D. Jakominich et al., Real Time Digital Power System Simulator Design Consideration And Relay Performance Evaluation, 1995, ICDS'95.*
Hassoun, Fundamental of Artificial Neural Networks, 1995, The MIT Press.*

* cited by examiner

*Primary Examiner*—Anthony Knight
*Assistant Examiner*—Nathan H. Brown, Jr.
(74) *Attorney, Agent, or Firm*—Kris T. Fredrick (57) ABSTRACT

A technique for enriching sparse data for machine learning techniques such as supervised artificial neural network includes receiving the sparse data and enriching the received data around a deviation of the mean of the received data using a predetermined distribution. The technique further includes outputting the enriched data for unbiased and increased performance during the machine learning.

52 Claims, 5 Drawing Sheets

FIG. 7

DISTRIBUTION THEORY BASED ENRICHMENT OF SPARSE DATA FOR MACHINE LEARNING

FIELD OF THE INVENTION

This invention relates generally to the field of intelligent information retrieval, and more particularly pertains to intelligent information retrieval based on machine learning.

BACKGROUND

The future of intelligent information retrieval is based on machine learning techniques such as Artificial Neural Network (ANN). ANN's ability to express non-linear relationships in data results in better classification and is best suited for information retrieval in applications such as pattern recognition, prediction, and classification.

The ANN technique attempts to emulate the architecture and information representation schemes of the human brain and its architecture depends on the goal to be achieved. The learning in ANN can be either supervised or unsupervised. In a supervised learning (SL) we assume what the result should be (like a teacher instructing a pupil). In this case we present the input, check what the output shows and then adjust the connection strengths between the input and output mapping until the correct output is given. This can be applied to all inputs until the network becomes as error free as possible. The SL method requires an output class declaration for each of the inputs.

Present SL methods require large numbers of sample inputs (data) to produce unbiased learning, prediction, and classification. When only sparse data is available, the SL methods require a greater number of iterations for convergence and this generally results in lower performance. Sparse data means available data is less than the required larger numbers of data to produce unbiased learning. The requirement of large amounts of data is generally a constraint. Current approaches use traditional techniques, including linear methods based on statistical techniques to compensate for the lack of large amounts of data when only sparse data is available. However, these methods can still result in biased (skewed) learning, classification, and prediction.

Therefore, there is a need in the art for unbiased learning, prediction, and classification using the SL method when only sparse data is available. Further, there is also a need in the art to increase performance and reduce the number of iterations required for a faster convergence by the SL method during machine learning when only sparse data is available.

SUMMARY OF THE INVENTION

One aspect of the present invention is a method for enriching sparse data for machine learning, such as supervised artificial neural network learning. The method is performed by receiving sparse data and reading a sample of the received sparse data. The read sample of data is checked for sparseness and enriched based on the outcome of the checking. The enriched data is outputted for unbiased and improved performance during machine learning.

Another aspect of the present invention is a computer readable medium having computer-executable instructions for performing a method of machine learning when only sparse data is available. According to the method, sparse data is received and a sample of the received sparse data is read. Then, the read sparse data is enriched around a deviation of the mean of the received data using a predetermined distribution. Then, the enriched data for unbiased machine learning is outputted.

Another aspect of the present invention is a computer system for machine learning in a sparse data environment. The computer system comprises a storage device, an output device and a processor programmed for repeatedly performing a method. According to the method, sparse data is received by the computer system. Then the method includes enriching the received data around a deviation of the mean of the received data using a predetermined distribution methodology. Then, outputting the enriched data for unbiased machine learning.

Another aspect of the present invention is a computer-implemented system for machine learning in a sparse data environment. The computer system comprises a receive module to receive sparse data. An analyzer enriches the received data around a deviation of the mean of the received data using a predetermined distribution, and an output module outputs the enriched data for unbiased learning and increased performance during machine learning.

Other aspects of the invention will be apparent on reading the following detailed description of the invention and viewing the drawings that form a part thereof.

DETAILED DESCRIPTION

This invention offers a technique to enrich sparse data for unbiased machine learning.

Figure 1:
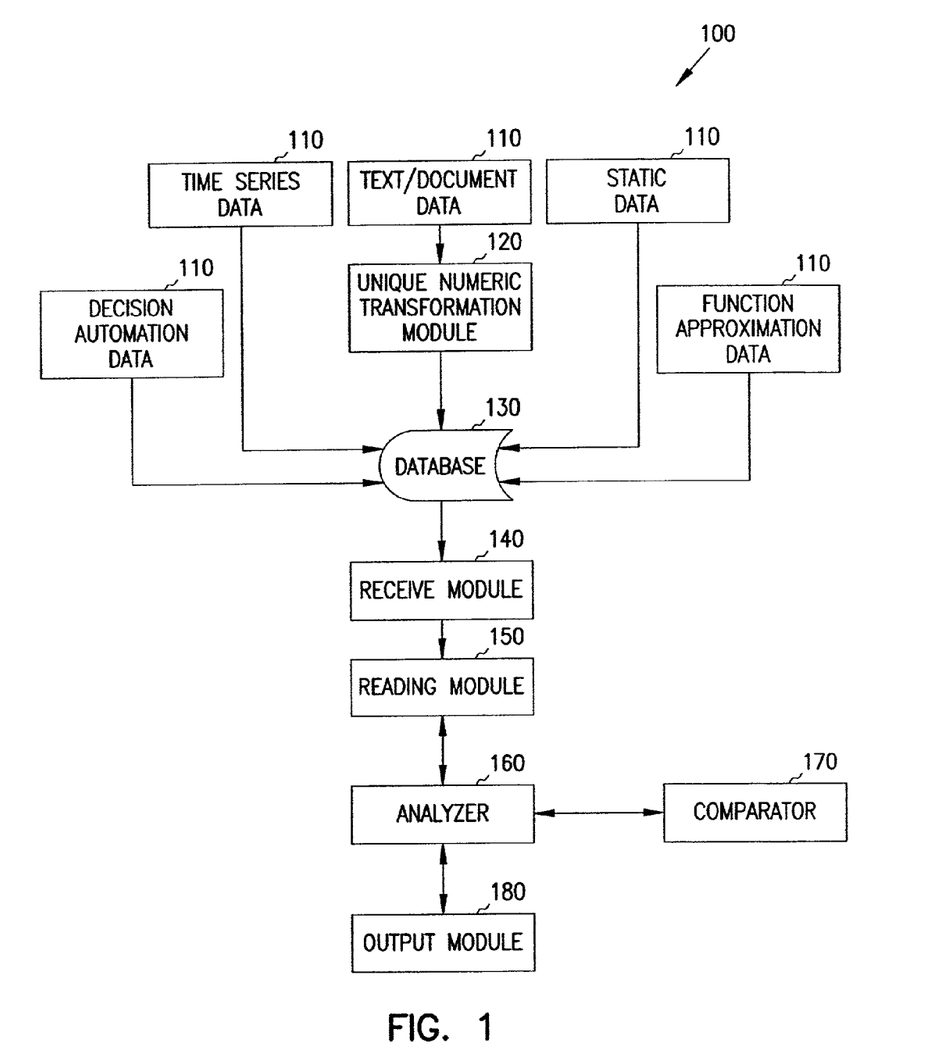
FIG. 1 is a block diagram of one embodiment of major components of the computer-implemented system according to the teachings of the present invention.

FIG. 1 illustrates an overview of one embodiment of a computer-implemented system 100 according to the present invention. A database 130 is connected to receive various types of input data 110. For example, the database 130 can receive data such as time series data, text/document data, static unstructured data, decision automation data, and/or function approximation data. Decision automation data means data encapsulating human judgment and domain expertise in software systems, which is necessary for computers to support human decision-making activities. For example, such data is already used in today's automobiles to embody control systems that make expert breaking decisions based on encapsulated judgment of complex real-time conditions. Function approximation means a curve-fitting method used to find close association between the actual and computed dependant variables to obtain a set of independent variables. In some embodiments, a unique numeric representation module 120 is coupled to receive text/document data 110 and transform the received text/document data into a unique numeric representation.

A receive module 140 is connected to database 130 and receives the sparse data from database 130. A reading module 150 is connected to the receive module 140 to read a sample of the received data from the receive module 140. In some embodiments, the reading module reads the sample of the received data such that the sample of read data has a predetermined window length. If the receive module 140 receives static data, then the reading module 150 reads a sample of the received static data using a static window of predetermined length. If the receive module 140 receives real-time data, then the reading module 150 reads a sample of the received real-time data using a dynamically varying window of predetermined length.

The following table illustrates one example of 20 sample data points having a predetermined window length of 20 sample data points read by the reading module 150. The data illustrated in the following table includes 6 features (attributes) and 4 different classes.

| Feature 1 | Feature 2 | Feature 3 | Feature 4 | Feature 5 | Feature 6 | Class Information | |
|---|---|---|---|---|---|---|---|
| 3.1 | 2.6 | 4.6 | 3.8 | 6.0 | 2.5 | 0 | 0 |
| 3.1 | 2.0 | 4.1 | 4.3 | 5.9 | 2.0 | 0 | 0 |
| 2.8 | 2.5 | 4.6 | 4.9 | 6.2 | 2.3 | 0 | 0 |
| 6.0 | 13.0 | 12.0 | 19.0 | 22.0 | 24.0 | 1 | 1 |
| 3.0 | 2.1 | 4.9 | 4.6 | 5.8 | 1.9 | 0 | 0 |
| 4.5 | 2.7 | 3.9 | 4.1 | 6.1 | 2.7 | 0 | 0 |
| 3.4 | 4.5 | 3.5 | 2.7 | 4.6 | 2.7 | 0 | 0 |
| 1.0 | 7.8 | 5.6 | 6.7 | 9.0 | 2.0 | 0 | 0 |
| 1.1 | 6.9 | 4.6 | 7.5 | 8.5 | 1.9 | 0 | 1 |
| 2.8 | 4.1 | 7.6 | 4.0 | 7.0 | 9.0 | 1 | 0 |
| 0.9 | 6.5 | 4.1 | 7.1 | 8.1 | 1.8 | 0 | 1 |
| 3.4 | 2.3 | 4.5 | 3.5 | 6.7 | 2.8 | 0 | 0 |
| 0.8 | 6.2 | 4.0 | 6.9 | 7.9 | 1.9 | 0 | 1 |
| 3.2 | 4.5 | 8.9 | 4.5 | 7.8 | 9.5 | 1 | 0 |
| 6.0 | 12.5 | 12.5 | 14.5 | 18.5 | 19.5 | 1 | 1 |
| 2.7 | 3.9 | 8.6 | 3.9 | 6.8 | 8.9 | 1 | 0 |
| 3.4 | 4.3 | 6.7 | 4.0 | 6.5 | 9.0 | 1 | 0 |
| 3.2 | 4.2 | 6.6 | 4.0 | 6.4 | 8.9 | 1 | 0 |
| 5.0 | 11.0 | 13.0 | 17.0 | 21.0 | 21.0 | 1 | 1 |
| 7.0 | 15.0 | 11.0 | 15.0 | 19.0 | 20.0 | 1 | 1 |

An analyzer 160 coupled to the reading module 150 rearranges the read data based on class when the class information is available in the read data. In the above table the class information is included in the last two columns. The following table illustrates how the analyzer 160 rearranges the data using the class information in the above-illustrated table.

| Feature 1 | Feature 2 | Feature 3 | Feature 4 | Feature 5 | Feature 6 | Class Information | |
|---|---|---|---|---|---|---|---|
| 3.4 | 2.3 | 4.5 | 3.5 | 6.7 | 2.8 | 0 | 0 |
| 3.1 | 2.6 | 4.6 | 3.8 | 6.0 | 2.5 | 0 | 0 |
| 3.1 | 2.0 | 4.1 | 4.3 | 5.9 | 2.0 | 0 | 0 |
| 2.8 | 2.5 | 4.6 | 4.9 | 6.2 | 2.3 | 0 | 0 |
| 3.0 | 2.1 | 4.9 | 4.6 | 5.8 | 1.9 | 0 | 0 |
| 4.5 | 2.7 | 3.9 | 4.1 | 6.1 | 2.7 | 0 | 0 |
| 3.4 | 4.5 | 3.5 | 2.7 | 4.6 | 2.7 | 0 | 0 |
| 1.0 | 7.8 | 5.6 | 6.7 | 9.0 | 2.0 | 0 | 0 |
| 1.1 | 6.9 | 4.6 | 7.5 | 8.5 | 1.9 | 0 | 1 |
| 0.9 | 6.5 | 4.1 | 7.1 | 8.1 | 1.8 | 0 | 1 |
| 0.8 | 6.2 | 4.0 | 6.9 | 7.9 | 1.9 | 0 | 1 |
| 3.2 | 4.5 | 8.9 | 4.5 | 7.8 | 9.5 | 1 | 0 |
| 2.8 | 4.1 | 7.6 | 4.0 | 7.0 | 9.0 | 1 | 0 |
| 2.7 | 3.9 | 8.6 | 3.9 | 6.8 | 8.9 | 1 | 0 |
| 3.4 | 4.3 | 6.7 | 4.0 | 6.5 | 9.0 | 1 | 0 |
| 3.2 | 4.2 | 6.6 | 4.0 | 6.4 | 8.9 | 1 | 0 |
| 5.0 | 11.0 | 13.0 | 17.0 | 21.0 | 21.0 | 1 | 1 |
| 6.0 | 13.0 | 12.0 | 19.0 | 22.0 | 24.0 | 1 | 1 |
| 7.0 | 15.0 | 11.0 | 15.0 | 19.0 | 20.0 | 1 | 1 |
| 6.0 | 12.5 | 12.5 | 14.5 | 18.5 | 19.5 | 1 | 1 |

In some embodiments, the analyzer 160 normalizes the rearranged data based on attributes in the read data. The following table illustrates how the analyzer 160 normalizes the rearranged data by dividing the data in the above-illustrated table by a constant. In some embodiments, the normalized data varies between 0 and 1 using a constant.

| Feature 1 | Feature 2 | Feature 3 | Feature 4 | Feature 5 | Feature 6 | Class Information | |
|---|---|---|---|---|---|---|---|
| 0.034 | 0.023 | 0.045 | 0.035 | 0.067 | 0.028 | 0 | 0 |
| 0.031 | 0.026 | 0.046 | 0.038 | 0.060 | 0.025 | 0 | 0 |
| 0.031 | 0.020 | 0.041 | 0.043 | 0.059 | 0.020 | 0 | 0 |
| 0.028 | 0.025 | 0.046 | 0.049 | 0.062 | 0.023 | 0 | 0 |
| 0.030 | 0.021 | 0.049 | 0.046 | 0.058 | 0.019 | 0 | 0 |
| 0.045 | 0.027 | 0.039 | 0.041 | 0.061 | 0.027 | 0 | 0 |
| 0.034 | 0.045 | 0.035 | 0.027 | 0.046 | 0.027 | 0 | 0 |
| 0.010 | 0.078 | 0.056 | 0.067 | 0.090 | 0.020 | 0 | 0 |
| 0.011 | 0.069 | 0.046 | 0.075 | 0.085 | 0.019 | 0 | 1 |
| 0.009 | 0.065 | 0.041 | 0.071 | 0.081 | 0.018 | 0 | 1 |
| 0.008 | 0.062 | 0.040 | 0.069 | 0.079 | 0.019 | 0 | 1 |
| 0.032 | 0.045 | 0.089 | 0.045 | 0.078 | 0.095 | 1 | 0 |
| 0.028 | 0.041 | 0.076 | 0.040 | 0.070 | 0.090 | 1 | 0 |
| 0.027 | 0.039 | 0.086 | 0.039 | 0.068 | 0.089 | 1 | 0 |
| 0.034 | 0.043 | 0.067 | 0.040 | 0.065 | 0.090 | 1 | 0 |
| 0.032 | 0.042 | 0.066 | 0.040 | 0.064 | 0.089 | 1 | 0 |
| 0.050 | 0.110 | 0.130 | 0.170 | 0.210 | 0.210 | 1 | 1 |
| 0.060 | 0.130 | 0.120 | 0.190 | 0.220 | 0.240 | 1 | 1 |
| 0.070 | 0.150 | 0.110 | 0.150 | 0.190 | 0.200 | 1 | 1 |
| 0.060 | 0.125 | 0.125 | 0.145 | 0.185 | 0.195 | 1 | 1 |

A comparator 170 coupled to the analyzer 160 checks the received data for sparseness. The analyzer 160 then enriches the checked data around the deviation of the mean of the received data using a predetermined distribution based on the outcome of the checking for unbiased learning and improved performance during machine learning. In some embodiments, the comparator 170 checks the received data for sparseness by comparing the received data with a predetermined number. The analyzer 160 in these embodiments enriches the received data around the deviation of the mean of the received data based on the outcome of the comparison. In some embodiments, the analyzer 160 checks each class of data for sparseness, and enriches each class around a deviation of the mean associated with the class based on the outcome of the checking by the analyzer 160. In some embodiments, the comparator 170 compares each class in the rearranged data with a predetermined number and the analyzer 160 enriches each class around a deviation of the mean associated with the class based on the outcome of the comparison by the comparator 170. In some embodiments, the predetermined number is in the range of about 25 to 100. In some embodiments, the analyzer 160 enriches the received data using predetermined distributions such as normal distribution, exponential distribution, logarithmic distribution, chi-square distribution, t-distribution, and/or F-distribution.

In some embodiments, the analyzer 160 computes additional data in each class using the equation:

$$\bar{x} \pm k\sigma$$

wherein $\bar{x}$ is the computed mean associated with each class, k is a constant varying between 0.25 to 3, and $\sigma$ is the computed standard deviation associated with each class.

The following table illustrates the computation of the mean and standard deviation for each class of data in the above-illustrated table. In the following table the highest magnitude data is arranged to be in the left most column of the table, and the lowest magnitude data is arranged to be in the right most column of the table.

| Feature 1 | Feature 2 | Feature 3 | Feature 4 | Feature 5 | Feature 6 | Class Information | |
|---|---|---|---|---|---|---|---|
| 0.034 | 0.023 | 0.045 | 0.035 | 0.067 | 0.028 | 0 | 0 |
| 0.031 | 0.026 | 0.046 | 0.038 | 0.060 | 0.025 | 0 | 0 |
| 0.031 | 0.020 | 0.041 | 0.043 | 0.059 | 0.020 | 0 | 0 |
| 0.028 | 0.025 | 0.046 | 0.049 | 0.062 | 0.023 | 0 | 0 |
| 0.030 | 0.021 | 0.049 | 0.046 | 0.058 | 0.019 | 0 | 0 |
| 0.045 | 0.027 | 0.039 | 0.041 | 0.061 | 0.027 | 0 | 0 |
| 0.034 | 0.045 | 0.035 | 0.027 | 0.046 | 0.027 | 0 | 0 |
| 0.010 | 0.078 | 0.056 | 0.067 | 0.090 | 0.020 | 0 | 0 |
| 0.0304 | 0.0331 | 0.0446 | 0.0433 | 0.0630 | 0.0236 | Mean | |
| 0.0091 | 0.0185 | 0.0060 | 0.0110 | 0.0116 | 0.0034 | Standard Deviation | |
| 0.011 | 0.069 | 0.046 | 0.075 | 0.085 | 0.019 | 0 | 1 |
| 0.009 | 0.065 | 0.041 | 0.071 | 0.081 | 0.018 | 0 | 1 |
| 0.008 | 0.062 | 0.040 | 0.069 | 0.079 | 0.019 | 0 | 1 |
| 0.093 | 0.0653 | 0.0423 | 0.0717 | 0.0817 | 0.0187 | Mean | |
| 0.0012 | 0.0029 | 0.0026 | 0.0025 | 0.0025 | 0.0025 | Standard Deviation | |
| 0.032 | 0.045 | 0.089 | 0.045 | 0.078 | 0.095 | 1 | 0 |
| 0.028 | 0.041 | 0.076 | 0.040 | 0.070 | 0.090 | 1 | 0 |
| 0.027 | 0.039 | 0.086 | 0.039 | 0.068 | 0.089 | 1 | 0 |
| 0.034 | 0.043 | 0.067 | 0.040 | 0.065 | 0.090 | 1 | 0 |
| 0.032 | 0.042 | 0.066 | 0.040 | 0.064 | 0.089 | 1 | 0 |
| 0.0306 | 0.0420 | 0.0768 | 0.0408 | 0.0690 | 0.0906 | Mean | |
| 0.0027 | 0.0020 | 0.0095 | 0.0021 | 0.0050 | 0.0022 | Standard Deviation | |
| 0.050 | 0.110 | 0.130 | 0.170 | 0.210 | 0.210 | 1 | 1 |
| 0.060 | 0.130 | 0.120 | 0.190 | 0.220 | 0.240 | 1 | 1 |
| 0.070 | 0.150 | 0.110 | 0.150 | 0.190 | 0.200 | 1 | 1 |
| 0.060 | 0.125 | 0.125 | 0.145 | 0.185 | 0.195 | 1 | 1 |
| 0.0600 | 0.128 | 0.1213 | 0.1637 | 0.2011 | 0.2112 | Mean | |
| 0.0071 | 0.0143 | 0.0074 | 0.0178 | 0.0143 | 0.0175 | Standard Deviation | |

In some embodiments, the analyzer 160, in addition to the above computed mean and standard deviation, uses the following distribution scheme to enrich the data.

$$[X_{mn}][W]=[B_i]$$

wherein W is a weight matrix, X is input patterns, and $B_i$'s are the classes; and rearranges in the max-min-max pattern:

Let for class i $$(Rx_{1N}-Rx_{2N})>(Rx_{2N}-Rx_{3N})> \ldots >(Rx_{(i-1)N}-Rx_{iN})=(Rx_{(i+2)N}-Rx_{(i+1)N})<(Rx_{(i+3)}-Rx_{(i+2)})< \ldots <(Rx_{AN}-Rx_{(A-1)N})$$

where $Rx_{1N} \rightarrow$ Row $x_{1N}$.

The following table illustrates enriching of the rearranged sparse data in the above table using the computed mean and standard deviation for unbiased learning. It can be seen from the following table that the data in each class has been increased to a total of 10 data points from as few as 3 data points in a class in the read data shown in the above-illustrated table.

| Feature 1 | Feature 2 | Feature 3 | Feature 4 | Feature 5 | Feature 6 | Class Information | |
|---|---|---|---|---|---|---|---|
| 0.0031 | 0.0000 | 0.0266 | 0.0103 | 0.0282 | 0.0134 | 0 | 0 |
| 0.0123 | 0.0130 | 0.0382 | 0.0281 | 0.0423 | 0.0186 | 0 | 0 |
| 0.0201 | 0.0250 | 0.0400 | 0.0350 | 0.0512 | 0.0201 | 0 | 0 |
| 0.0259 | 0.0290 | 0.0426 | 0.0410 | 0.0589 | 0.0226 | 0 | 0 |
| 0.0304 | 0.0332 | 0.0446 | 0.0433 | 0.0630 | 0.0236 | 0 | 0 |
| 0.0304 | 0.0332 | 0.0446 | 0.0433 | 0.0630 | 0.0236 | 0 | 0 |
| 0.0349 | 0.0398 | 0.0468 | 0.0456 | 0.0676 | 0.0248 | 0 | 0 |
| 0.0407 | 0.0512 | 0.0520 | 0.0498 | 0.0732 | 0.0266 | 0 | 0 |
| 0.0485 | 0.0723 | 0.0550 | 0.0623 | 0.0812 | 0.0298 | 0 | 0 |
| 0.0576 | 0.1100 | 0.0606 | 0.0763 | 0.0977 | 0.0338 | 0 | 0 |
| 0.0894 | 0.0566 | 0.0345 | 0.0642 | 0.0742 | 0.0112 | 0 | 1 |
| 0.0912 | 0.0594 | 0.0386 | 0.0677 | 0.0778 | 0.0145 | 0 | 1 |
| 0.0921 | 0.0630 | 0.0409 | 0.0694 | 0.0791 | 0.0167 | 0 | 1 |
| 0.0926 | 0.0647 | 0.0419 | 0.0706 | 0.0804 | 0.0176 | 0 | 1 |
| 0.0930 | 0.0653 | 0.0423 | 0.0717 | 0.0817 | 0.0187 | 0 | 1 |
| 0.0930 | 0.0653 | 0.0423 | 0.0717 | 0.0817 | 0.0187 | 0 | 1 |
| 0.0934 | 0.0660 | 0.0430 | 0.0721 | 0.0824 | 0.0199 | 0 | 1 |
| 0.0940 | 0.0688 | 0.0457 | 0.0789 | 0.0838 | 0.0216 | 0 | 1 |
| 0.0951 | 0.0708 | 0.0478 | 0.0832 | 0.0856 | 0.0231 | 0 | 1 |
| 0.0966 | 0.0740 | 0.0501 | 0.0792 | 0.0892 | 0.0262 | 0 | 1 |
| 0.0225 | 0.0360 | 0.0480 | 0.0345 | 0.0540 | 0.0840 | 1 | 0 |
| 0.0256 | 0.0385 | 0.0590 | 0.0362 | 0.0590 | 0.0872 | 1 | 0 |
| 0.0278 | 0.0400 | 0.0680 | 0.0382 | 0.0640 | 0.0887 | 1 | 0 |
| 0.0298 | 0.0410 | 0.0740 | 0.0398 | 0.0670 | 0.0899 | 1 | 0 |
| 0.0306 | 0.0420 | 0.0768 | 0.0408 | 0.0690 | 0.0906 | 1 | 0 |
| 0.0306 | 0.0420 | 0.0768 | 0.0408 | 0.0690 | 0.0906 | 1 | 0 |
| 0.0324 | 0.0430 | 0.0787 | 0.0423 | 0.0710 | 0.0915 | 1 | 0 |
| 0.0349 | 0.0445 | 0.0823 | 0.0434 | 0.0740 | 0.0928 | 1 | 0 |
| 0.0368 | 0.0460 | 0.0903 | 0.0445 | 0.0789 | 0.0936 | 1 | 0 |
| 0.0387 | 0.0480 | 0.1050 | 0.0471 | 0.0894 | 0.0972 | 1 | 0 |
| 0.0387 | 0.0851 | 0.0991 | 0.1103 | 0.1584 | 0.1587 | 1 | 1 |
| 0.0478 | 0.1076 | 0.1034 | 0.1312 | 0.1732 | 0.1845 | 1 | 1 |
| 0.0543 | 0.1165 | 0.1145 | 0.1423 | 0.1896 | 0.1987 | 1 | 1 |
| 0.0586 | 0.1200 | 0.1198 | 0.1543 | 0.1976 | 0.2076 | 1 | 1 |
| 0.0600 | 0.1280 | 0.1213 | 0.1637 | 0.2011 | 0.2112 | 1 | 1 |
| 0.0600 | 0.1280 | 0.1213 | 0.1637 | 0.2011 | 0.2112 | 1 | 1 |
| 0.0614 | 0.1300 | 0.1251 | 0.1688 | 0.2077 | 0.2187 | 1 | 1 |
| 0.0687 | 0.1390 | 0.1287 | 0.1767 | 0.2176 | 0.2345 | 1 | 1 |
| 0.0723 | 0.1483 | 0.1345 | 0.1856 | 0.2293 | 0.2432 | 1 | 1 |
| 0.0813 | 0.1709 | 0.1435 | 0.2171 | 0.2442 | 0.2637 | 1 | 1 |

The following illustrates one example embodiment of computing the additional data points using the upper left most sparse data in the above-illustrated table. Following is the computed mean and standard deviation for the upper left most sparse data:

$\bar{x}=0.0304$ $\sigma=0.0091$

Using the computed mean and standard deviation in the above illustrated equation $\bar{x} \pm k\sigma$ is $0.0304 \pm 3*0.0091$ provides extreme data points for the upper left most sparse data of 0.0031 and 0.0576. Therefore all of the data points for the upper left most sparse data have to lie between 0.0031 and 0.0576. Based on the above-illustrated table we are increasing the data points in the upper left most part of the table are increased from 8 to 10. This means a total of 10 data points are generated for the upper left most sparse data. Since, 10 is an even number, the $5^{th}$ and $6^{th}$ values are assigned the same value as the mean, which is 0.3040. The remaining values are computed using the max-min-max pattern illustrated above as follows:

Assuming $R_1$=first value, $R_2$=second value and so on, 0.0123−0.0031=0.0092 ($R_2$−$R_1$)
0.0201−0.0123=0.0078 ($R_3$−$R_2$)
0.0259−0.0201=0.0058 ($R_4$−$R_3$)
0.0304−0.0259=0.0045 ($R_5$−$R_4$)
0.0349−0.0304=0.0094 ($R_7$−$R_6$)
0.0407−0.0349=0.0058 ($R_8$−$R_7$)
0.0485−0.0407=0.0078 ($R_9$−$R_8$)
0.0576−0.0485=0.0091 ($R_{10}$−$R_9$)

The above-illustrated computation follows the max-min-max pattern as outlined in the following equation.

$(R_2-R_1)>(R_3-R_2)>(R_4-R_3)>(R_5-R_4)=(R_7-R_6)<(R_8-R_7)<(R_9-R_8)<(R_{10}-R_9)$
$0.0091>0.0078>0.0058>0.0045=0.0045<0.0058<0.0078<0.0091$

In some embodiments, the received data is enriched by using an equal difference method. Equal difference method means $(R_2-R_1)=(R_3-R_2)=(R_4-R_3) \ldots =(R_{10}-R_9)$. Some times the enriched data may have to be realigned when using such an equal difference distribution scheme.

An output module 180 coupled to the analyzer 160 outputs the enriched sparse data from the analyzer 160 for machine learning such as supervised artificial neural network learning.

Figure 2:
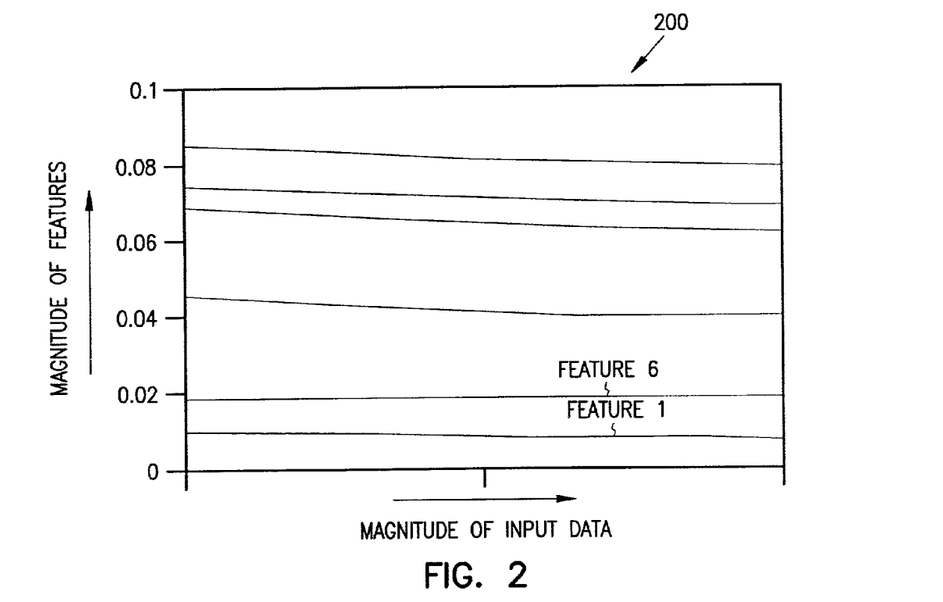
FIGS. 2 and 3 graphically illustrate the sparse data before enriching the sparse data.
Figure 3:
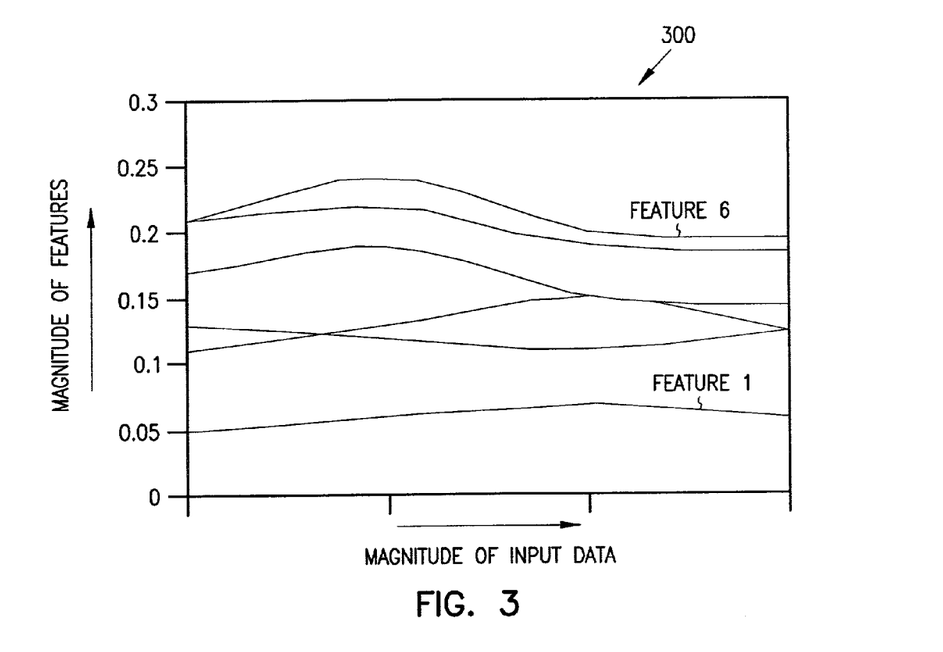
Figure 4:
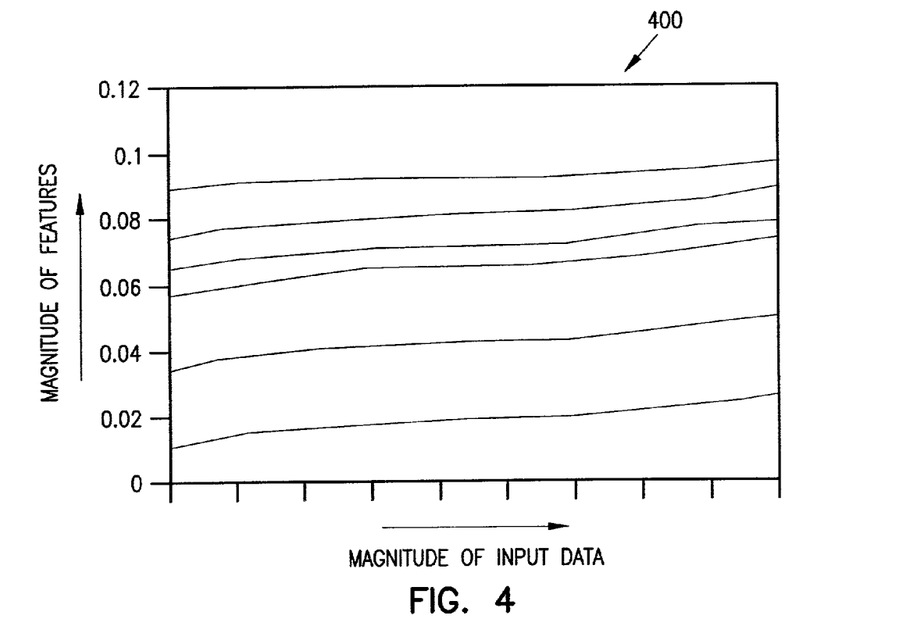
FIGS. 4 and 5 graphically illustrate the enriched data after enriching the sparse data.
Figure 5:
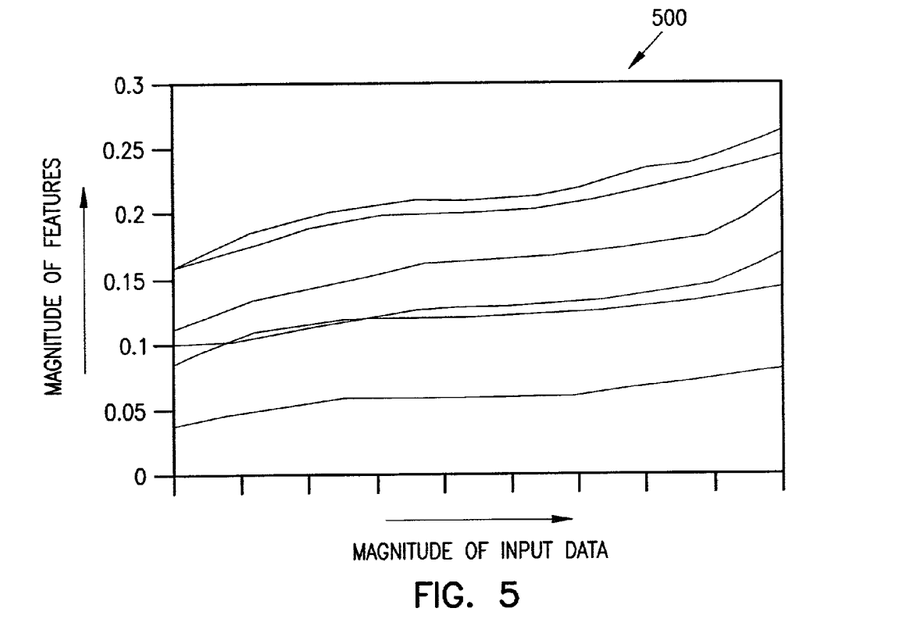

FIGS. 2 and 3 graphically illustrate the received sparse data in the second and fourth classes of the above-illustrated table before enriching the data. FIGS. 4 and 5 illustrate graphically the enriched second and fourth classes of sparse data. Comparing the two graphs 2 and 3 (including data before enrichment) with the corresponding two graphs 3 and 4 (including data after enrichment), reveals no change in the attributes of the received sparse data after enriching the data. These graphs clearly illustrate that the enriching of the sparse data according to the present invention does not affect the received data integrity.

Figure 6:
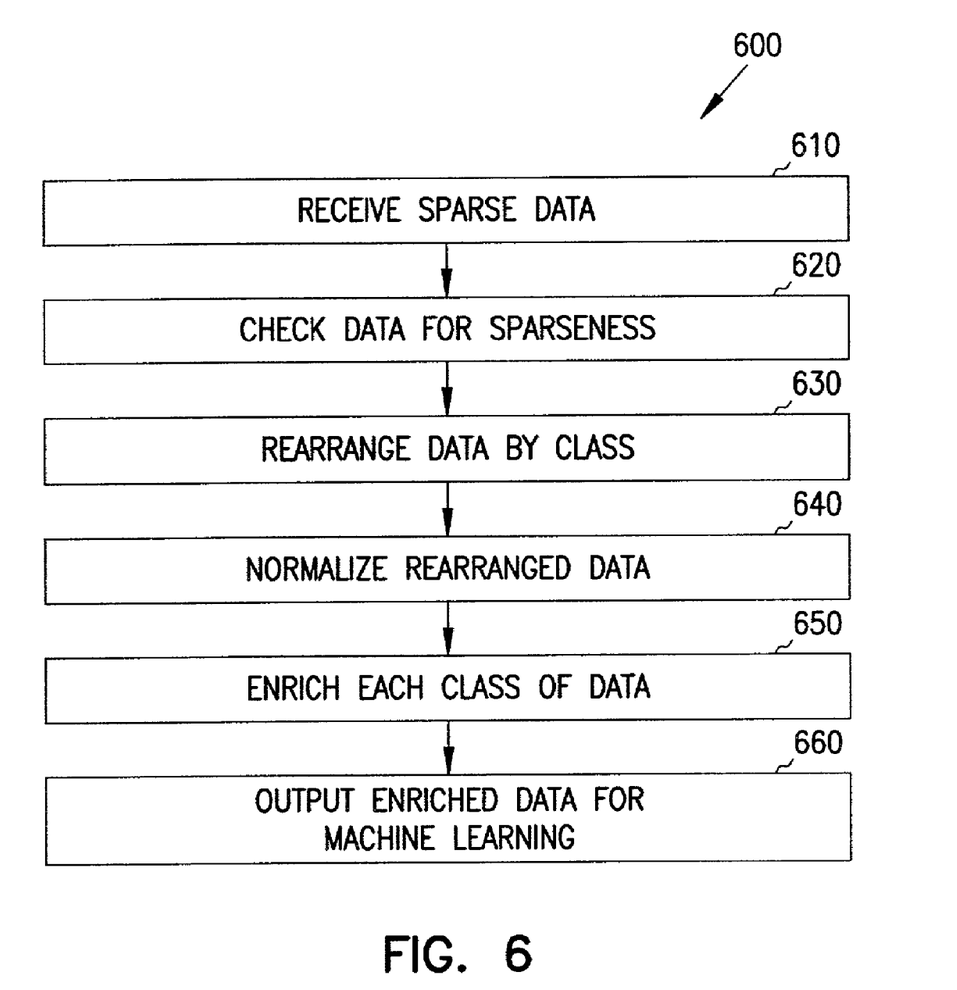
FIG. 6 is a flow chart illustrating the overall operation of the embodiment shown in FIG. 1.

FIG. 6 illustrates an overview of one embodiment of the process 600 of the present invention. As shown in FIG. 6, one aspect of the present invention is a computer readable medium having computer-executable instructions for performing the process 600 for enriching sparse data for machine learning. Machine learning comprises supervised artificial neural network learning.

The process begins with step 610 by receiving sparse data such as time series data (for example, time series data can include real-time data such as share market data and weather forecast data), text document data, and/or static unstructured data. In some embodiments, if the received data is static data, then the process includes receiving the data using a predetermined window length, and if the received data is dynamic data, then the process includes receiving the dynamic data using a dynamically varying window of predetermined window length. In some embodiments, if the received data is real-time data, then the process includes repeating the reading of the sample of the received real-time data using a dynamically varying window of predetermined window length.

Step 620 includes checking the received data for sparseness. In some embodiments, checking the received data for sparseness includes comparing the received data with a predetermined number.

Step 630 can include rearranging the received data based on class, when the received data is scrambled and not already separated by class. The process of rearranging is discussed in more detail with reference to FIG. 1. Step 640 can include normalizing the rearranged data based on attributes in the data. Again the process of normalizing is discussed in more detail with reference to FIG. 1.

Step 650 includes enriching the received sparse data around a deviation of the mean of the received data using a predetermined distribution. In some embodiments, enriching the received data includes enriching the checked data around the deviation of the mean of the received data based on the outcome of the checking. In some embodiments, the enriching of the sparse data includes enriching the received data around the deviation of the mean of the received data based on the outcome of the comparison. In some embodiments, checking includes checking each class of data in the rearranged data for sparseness, and enriching each class of data around a deviation of the mean associated with the respective class based on the outcome of the checking. In these embodiments, the process includes comparing each class of data to a predetermined number, and further includes enriching each class around a deviation of the mean associated with the respective class based on the outcome of the comparison. Also in these embodiments enriching each class around a deviation of the mean includes computing the mean and standard deviation for each class of data in the rearranged data and further generating additional data for each class using an associated computed mean and standard deviation.

In some embodiments, generating additional data further includes generating additional data between limits computed using the equation:

$$\bar{x} \pm k\sigma$$

wherein $\bar{x}$ is the computed mean associated with each class, k is a constant varying between 0.25 to 3, and $\sigma$ is the computed standard deviation associated with each class. The computation of additional data using these embodiments is discussed in more detail with reference to FIG. 1.

In some embodiments, the predetermined distribution further includes arranging the enriched data using the equation:

$$[X_{mn}][W]=[B_i]$$

wherein W is a weight matrix, X is input patterns, and $B_i$'s are the classes; and rearranging in the max-min-max pattern:

Let for class i $(Rx_{1N}-Rx_{2N})>(Rx_{2N}-Rx_{3N})> \ldots >(Rx_{(i-1)N}-Rx_{iN})=$
$(Rx_{(i+2)N}-Rx_{(i+1)N})<(Rx_{(i+3)}-Rx_{(i+2)})< \ldots$
$<(Rx_{AN}-Rx_{(A-1)N})$ where $Rx_{1N} \rightarrow Row\ x_{1N}$.

The enriching of the data using the above equation is discussed in more detail with reference to FIG. 1.

In some embodiments, the predetermined distribution includes distributions such as normal distribution, exponential distribution, logarithmic distribution, chi-square distribution, t-distribution, and/or F-distribution.

Step 660 includes outputting the enriched data for unbiased learning and improved performance during the machine learning such as the supervised artificial neural network learning.

The method 600 shown in FIG. 6, may be implemented as a receive module 140, a reading module 150, an analyzer 160, and/or a comparator 170, as shown in FIG. 1. Various aspects of the present invention are implemented in software, which may be run in the environment shown in FIG. 6 or any other suitable computing environment. The present invention is operable in a number of other general purpose or special purpose computing environments. Some computing environments are personal computers, general-purpose computers, server computers, hand held devices, laptop devices, multiprocessors, microprocessors, set top boxes, programmable consumer electronics, network PCS, mini-computers, mainframe computers, distributed computing environments and the like to execute the code, which is stored on a computer readable medium. The present invention may be implemented in part or in whole as computer-executable instructions, such as program modules that are executed by a computer. Generally, program modules include routines, programs, objects, components, data structures and the like to perform particular tasks or to implement particular abstract data types. In a distributed computing environment, program modules may be located in local or remote storage devices.

Figure 7:
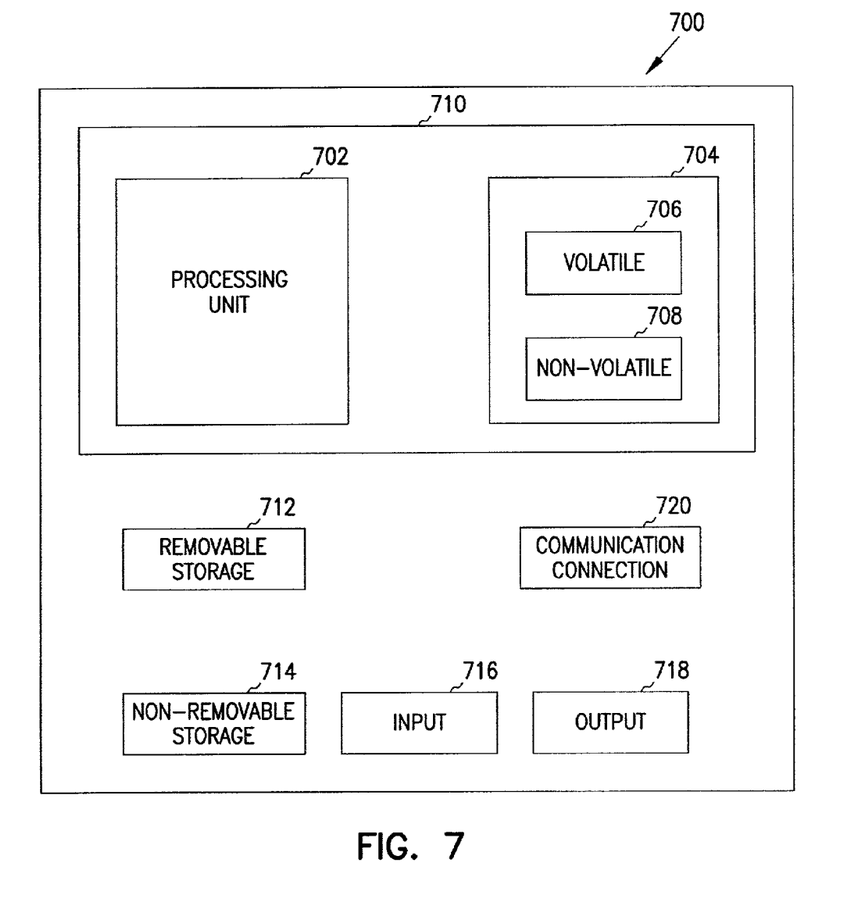
FIG. 7 shows an example of a suitable computing system environment for implementing embodiments of the present invention, such as those shown in FIGS. 1 and 6.

FIG. 7 shows an example of a suitable computing system environment 700 for implementing embodiments of the present invention, such as those shown in FIGS. 1 and 6. Various aspects of the present invention are implemented in software, which may be run in the environment shown in FIG. 7 or any other suitable computing environment. The present invention is operable in a number of other general purpose or special purpose computing environments. Some computing environments are personal computers, server computers, hand-held devices, laptop devices, multiprocessors, microprocessors, set top boxes, programmable consumer electronics, network PCS, minicomputers, mainframe computers, distributed computing environments, and the like. The present invention may be implemented in part or in whole as computer-executable instructions, such as program modules that are executed by a computer. Generally, program modules include routines, programs, objects, components, data structures and the like to perform particular tasks or implement particular abstract data types. In a distributed computing environment, program modules may be located in local or remote storage devices.

FIG. 7 shows a general computing device in the form of a computer 710, which may include a processing unit 702, memory 704, removable storage 712, and non-removable storage 714. The memory 704 may include volatile 706 and non-volatile memory 708. Computer 710 may include—or have access to a computing environment that includes—a variety of computer-readable media, such as volatile 706 and non-volatile memory 708, removable 712 and non-removable storage 714. Computer storage includes RAM, ROM, EPROM & EEPROM, flash memory or other memory technologies, CD ROM, Digital Versatile Disks (DVD) or other optical disk storage, magnetic cassettes, magnetic tape, magnetic disk storage or other magnetic storage devices, or any other medium capable of storing computer-readable instructions. Computer 710 may include or have access to a computing environment that includes input 716, output 718, and a communication connection 720. The computer may operate in a networked environment using a communication connection to connect to one or more remote computers. The remote computer may include a personal computer, server, router, network PC, a peer device or other common network node, or the like. The communication connection may include a Local Area Network (LAN), a Wide Area Network (WAN) or other networks.

CONCLUSION

The above-described computer-implemented method and system provides a technique for enriching sparse data for unbiased learning and improved performance during a machine learning technique such as supervised artificial neural network learning.

The above description is intended to be illustrative, and not restrictive. Many other embodiments will be apparent to those skilled in the art. The scope of the invention should therefore be determined by the appended claims, along with the full scope of equivalents to which such claims are entitled.

What is claimed is:

1. A computer-implemented method for enriching sparse data for machine learning, comprising:
    receiving the sparse data, wherein the received data comprises data selected from the group consisting of static data and real-time data;
    if the received data is static data, then reading a sample of the received static data using a predetermined window length; and
    if the received data is real-time data, then reading a sample of the received real-time data using a dynamically varying window of predetermined window length;
    enriching the received data around a deviation of the mean of the received data using a predetermined distribution; and
    outputting the enriched data for unbiased learning and improved performance during the machine learning.

2. The method of claim 1, wherein machine learning comprises:
    supervised artificial neural network learning.

3. The method of claim 1, further comprising:
    checking the received data for sparseness; and
    enriching the checked data around the deviation of the mean of the received data based on the outcome of the checking.

4. The method of claim 1, wherein checking the received data further comprises:
    comparing the received data with a predetermined number.

5. The method of claim 4, wherein enriching the received data further comprises:
    enriching the received data around the deviation of the mean of the received data based on the outcome of the comparison.

6. The method of claim 1, further comprising:
    rearranging the received data based on class.

7. The method of claim 6, further comprising:
    normalizing the rearranged data based on attributes in the rearranged data.

8. The method of claim 6, further comprising:
    checking each class of data in the rearranged data for sparseness; and
    enriching each class of data around a deviation of the mean associated with the respective class based on the outcome of the checking.

9. The method of claim 8, wherein checking each class of data further comprises:
    comparing each class of data to a predetermined number.

10. The method of claim 9, wherein enriching each class of data comprises:
    enriching each class around a deviation of the mean associated with the respective class based on the outcome of the comparison.

11. The method of claim 10, wherein enriching each class around a deviation of the mean associated with the respective class further comprises:
    computing the mean and standard deviation for each class of data in the rearranged data; and
    generating additional data for each class using the associated computed mean and standard deviation.

12. The method of claim 11, wherein generating additional data further comprises:
    generating additional data between limits computed using the equation:

$$\bar{x} \pm k\sigma$$

wherein $\bar{x}$ is the computed mean associated with each class, k is a constant varying between 0.25 to 3, and σ is the computed standard deviation associated with each class.

13. The method of claim 1, further comprising:
if the received data is real-time data, then repeating the reading of the sample of the received real-time data using a dynamically varying window of predetermined window length.

14. A computer-implemented method for enriching sparse data for machine learning, comprising:
receiving the sparse data;
enriching the received data around a deviation of the mean of the received data using a predetermined distribution, wherein the predetermined distribution comprises distributions selected from the group consisting of normal distribution, exponential distribution, logarithmic distribution, chi-square distribution, t-distribution, and F-distribution; and
outputting the enriched data for unbiased learning and improved performance during the machine learning.

15. A computer readable medium having computer-executable instructions for performing a method of machine learning when only sparse data is available, comprising:
enriching the sparse data around a deviation of the mean of the received data using a predetermined distribution selected from the group consisting of normal distribution, exponential distribution, logarithmic distribution, chi-square distribution, t-distribution, and F-distribution; and
outputting the enriched data for unbiased machine learning.

16. The computer readable medium of claim 15, wherein machine learning comprises:
supervised artificial neural network learning.

17. The computer readable medium of claim 15, further comprising:
checking the received data for sparseness; and
enriching the received data around the deviation of the mean of the received data based on the outcome of the checking.

18. The computer readable medium of claim 15, wherein checking the received data further comprises:
comparing the received data with a predetermined number.

19. The computer readable medium of claim 18, wherein enriching the received data further comprises:
enriching the received data around the deviation of the mean of the received data based on the outcome of the comparison.

20. The computer readable medium of claim 15, further comprising:
rearranging the received data based on class.

21. The computer readable medium of claim 20, further comprising:
normalizing the rearranged data based on attributes in the rearranged data.

22. The computer readable medium of claim 20, further comprising:
checking each class of data in the rearranged data for sparseness; and
enriching each class of data around a deviation of the mean associated with the respective class based on the outcome of the checking.

23. The computer readable medium of claim 22, wherein checking the each class of data further comprises:
comparing each class of data to a predetermined number.

24. The computer readable medium of claim 23, wherein enriching the each class of data comprises:
enriching each class around a deviation of the mean associated with the respective class based on the outcome of the comparison.

25. The computer readable medium of claim 24, wherein enriching each class around a deviation of the mean associated with the respective class further comprises:
computing the mean and standard deviation for each class of data in the rearranged data; and
generating additional data for each class using the associated computed mean and standard deviation.

26. The computer readable medium of claim 25, wherein generating additional data further comprises:
generating additional data between limits computed using the equation:

$$\bar{x} \pm k\sigma$$

wherein $\bar{x}$ is the mean associated with each class, k is a constant varying between 0.25 to 3, and σ is the standard deviation associated with each class.

27. The computer readable medium of claim 15, wherein the received data comprises data selected from the group consisting of static data and real-time data.

28. The computer readable medium of claim 27, further comprising:
if the received data is static data, then reading a sample of the received static data using a predetermined window length; and
if the received data is real-time data, then reading a sample of the received real-time data using a dynamically varying window of predetermined window length.

29. The computer readable medium of claim 28, further comprising:
if the received data is real-time data, then repeating the reading of the sample of the received real-time data using a dynamically varying window of predetermined window length.

30. A computer system for a machine learning in a sparse data environment, comprising:
a storage device;
an output device; and
a processor programmed to repeatedly perform a method, comprising:
receiving the data;
enriching the received data around a deviation of mean of the received data using a predetermined distribution selected from the group consisting of normal distribution, exponential distribution, logarithmic distribution, chi-square distribution, t-distribution, and F-distribution; and
outputting the enriched data for unbiased machine learning.

31. The system of claim 30, wherein machine learning comprises:
supervised artificial neural network learning.

32. The system of claim 30, further comprising:
rearranging the received data based on class.

33. The system of claim 32, further comprising:
normalizing the rearranged data based on attributes in the rearranged data.

34. The system of claim 32, further comprising:
checking each class of data in the rearranged data for sparseness; and
enriching each class of data around a deviation of the mean associated with the respective class based on the outcome of the checking.

35. The system of claim 34, wherein checking the each class of data further comprises:
comparing each class of data to a predetermined number.

36. The system of claim 35, wherein enriching each class of data comprises:
enriching each class around a deviation of mean associated with the respective class based on the outcome of the comparison.

37. The system of claim 36, wherein enriching the each class around a deviation of mean associated with the respective class further comprises:
computing the mean and standard deviation for each class of data in the rearranged data; and
generating additional data for each class using the associated computed mean and standard deviation.

38. The system of claim 37, wherein generating additional data further comprises:
generating additional data between limits computed using the equation:

$$\bar{x} \pm k\sigma$$

wherein $\bar{x}$ is the mean associated with each class, k is a constant varying between 0.25 to 3, and $\sigma$ is the standard deviation associated with each class.

39. A computer-implemented system for machine learning in a sparse data environment, comprising:
a receive module to receive sparse data;
a database coupled to the receive module to receive and store sparse data; and
a unique numeric transformation module coupled to the database to extract words from text stored in the database and to transform each of the extracted words into a unique numerical representation;
an analyzer to enrich the received data around a deviation of the received data using a predetermined distribution; and
an output module coupled to the analyzer to output the enriched data for unbiased learning and increased performance during machine learning.

40. The system of claim 39, further comprising:
a database coupled to the receive module to receive and store sparse data.

41. The system of claim 39, wherein machine learning comprises:
supervised artificial neural network learning.

42. The system of claim 39, further comprising:
a comparator coupled to the analyzer to check the received data for sparseness, wherein the analyzer enriches the checked data around the deviation of the mean of the received data based on the outcome of the checking.

43. The system of claim 42, wherein the comparator checks the received data for sparseness by comparing the received data with a predetermined number.

44. The system of claim 43, wherein the analyzer enriches the received data around the deviation of the mean of the received data based on the outcome of the comparison.

45. The system of claim 44, wherein the analyzer rearranges the received data based on class.

46. The system of claim 45, wherein the analyzer normalizes the rearranged data based on attributes in the data.

47. The system of claim 45, wherein the analyzer checks each class of data for sparseness, and enriches each class around a deviation of the mean associated with the class based on the outcome of the checking by the analyzer.

48. The system of claim 47, wherein the comparator compares each class in the rearranged data with a predetermined number and wherein the analyzer enriches each class around a deviation of the mean associated with the class based on the outcome of the comparison by the comparator.

49. The system of claim 48, wherein the analyzer enriches data in each class by computing a mean and standard deviation for each class in the rearranged data, and the analyzer further generates additional data for each class based on the respective computed mean and standard deviation.

50. The system of claim 49, wherein the analyzer generates additional data between limits computed using the equation:

$$\bar{x} \pm k\sigma$$

wherein $\bar{x}$ is the mean associated with each class in the rearranged data, k is a constant varying between 0.25 to 3, and $\sigma$ is the standard deviation associated with each class in the rearranged data.

51. A computer-implemented system for machine learning in a sparse data environment, comprising:
a receive module to receive sparse data, wherein the received data comprises data selected from the group consisting of static data and real-time data;
a reading module coupled to the receive module that reads a sample of the received data having a predetermined window length;
an analyzer to enrich the received data around a deviation of the received data using a predetermined distribution; and
an output module coupled to the analyzer to output the enriched data for unbiased learning and increased performance during machine learning.

52. The system of claim 51, wherein the reading module repeats the reading of the sample of the received data using a dynamically varying window of predetermined window length when the received data is real-time data.

* * * * *